United States Patent [19]

Dunstan et al.

[11] 4,329,604

[45] May 11, 1982

[54] LOW LOSS BRUSHLESS DC MOTOR

[75] Inventors: Ericson M. Dunstan, Hidden Hills; William J. Gervais, Northridge; Bipin V. Gami, Chatsworth, all of Calif.

[73] Assignee: Micropolis Corporation, Canoga Park, Calif.

[21] Appl. No.: 63,856

[22] Filed: Aug. 6, 1979

[51] Int. Cl.³ .......................................... H02K 11/00
[52] U.S. Cl. ................................. 310/68 R; 310/268; 310/156
[58] Field of Search ............... 318/313, 326, 259, 138; 310/268, 156, 46; 360/68

[56] References Cited

U.S. PATENT DOCUMENTS

| | | | |
|---|---|---|---|
| 3,189,770 | 6/1965 | Henry-Baudot | 310/268 X |
| 3,231,807 | 1/1966 | Willis | 318/313 |
| 3,280,353 | 10/1966 | Haydon et al. | 310/268 X |
| 3,375,386 | 3/1968 | Hayner et al. | 310/268 |
| 3,498,569 | 3/1970 | Kjos | 310/46 X |
| 3,548,394 | 12/1970 | Felts | 360/98 |
| 3,569,753 | 3/1971 | Babikyan | 310/268 X |
| 3,845,339 | 10/1974 | Merkle et al. | 310/60 X |
| 4,117,519 | 9/1978 | Shioyama et al. | 310/268 X |
| 4,181,867 | 1/1980 | Muller | 310/268 X |
| 4,228,384 | 10/1980 | Arnold, Jr. et al. | 310/268 X |

Primary Examiner—Donovan F. Duggan
Attorney, Agent, or Firm—Poms, Smith, Lande & Rose

[57] ABSTRACT

A printed circuit motor is constructed with the printed circuit windings stationary, and therefore constituting the stator of the motor. The stator is mounted at the end of a heavy hollow supporting frame member. The rotor is mounted on the end of a shaft which is journaled within the hollow frame member, and the rotor extends outwardly in close proximity to the stator and around the outer periphery of the stator and back toward the hollow supporting member, with a permanent magnet assembly on one side of the printed circuit stator and the magnetic return path on the other side of it. The permanent magnet assembly and the magnetic return path are rigidly coupled so that no relative motion occurs between them. Electrical connections to the winding turns of the stator are brought out from the periphery of the stator close to its surface through an additional printed circuit board, and along the outer surface of the hollow frame member to pass the inner edge of the permanent magnet rotor. Timing for the energization of the coils of the printed circuit stator is controlled by three photosensors which are interrupted by the outer edge of the rotating return path of the rotor, which is provided with a peripheral interruptions to selectively block the light path to the photosensors. Six coils of the printed circuit stator are arranged in a Y-configuration and are selectively energized in accordance with the output from the photosensors.

16 Claims, 8 Drawing Figures

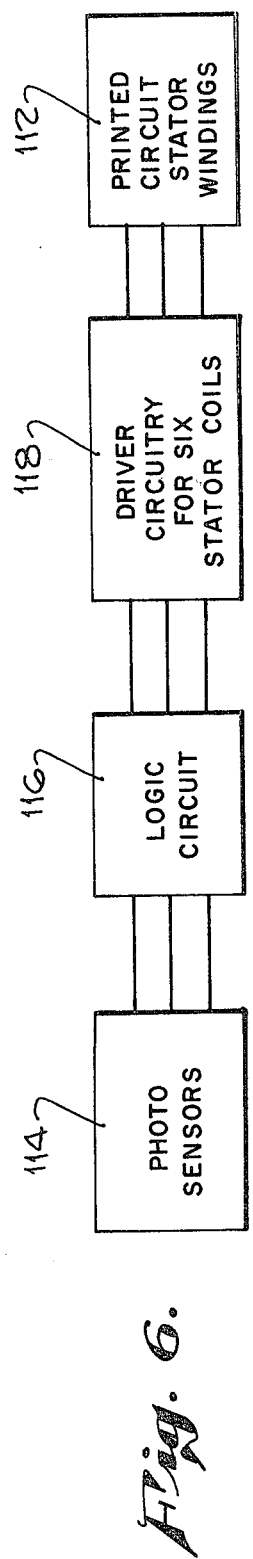
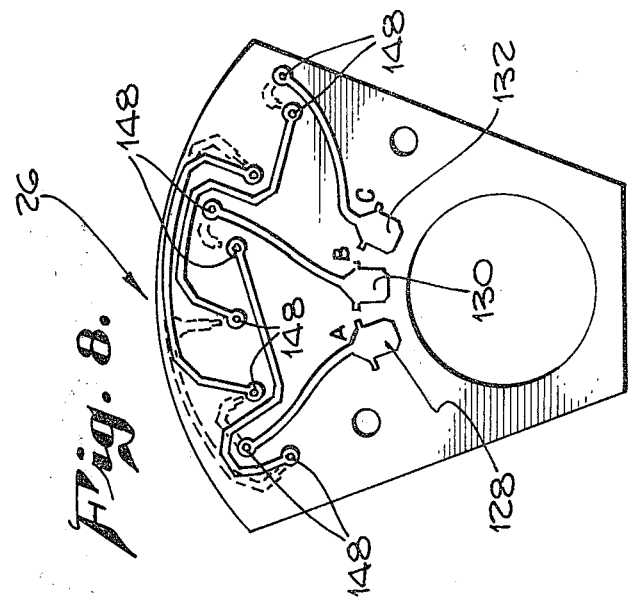
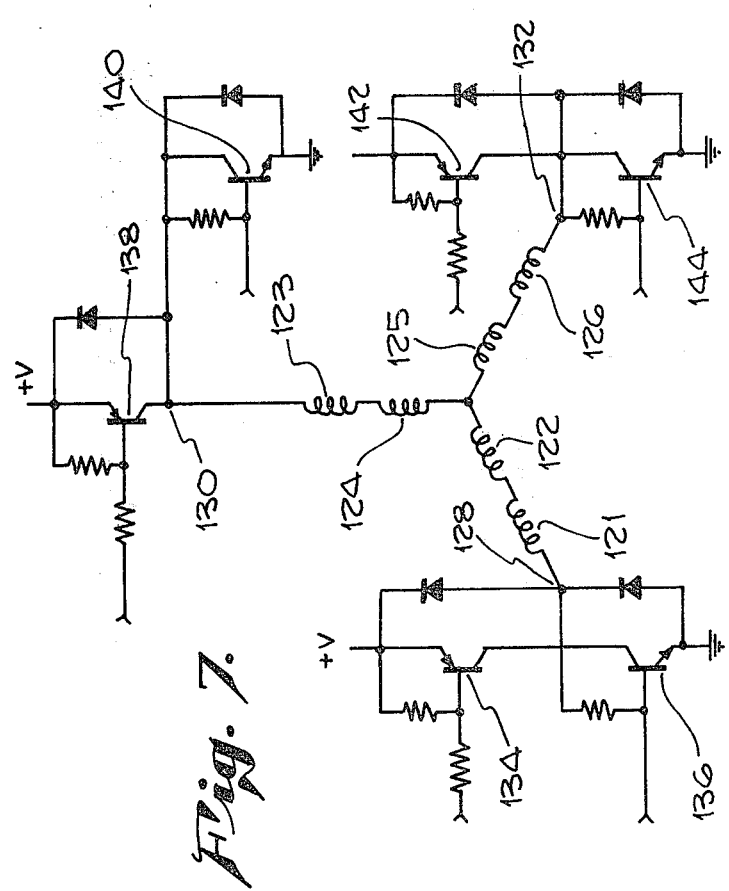
Fig. 6.
Fig. 8.
Fig. 7.

LOW LOSS BRUSHLESS DC MOTOR

FIELD OF THE INVENTION

The present invention relates to brushless DC motors, and to a rigid disk memory system employing such a motor.

BACKGROUND OF THE INVENTION

It has been proposed heretofore to use printed circuit windings in permanent magnet type DC motors. One patent which discloses a printed circuit armature for such a motor is U.S. Pat. No. 3,144,574 granted Aug. 11, 1964 to J. Henry-Baudot. The permanent magnet type DC motor described in this patent uses a permanent magnet structure as its stator and as its rotor a printed circuit armature with brushes to energize the winding. However, there are two problems associated with this configuration namely brush wear and electromagnetic radiation from the brush contact. Another alternative would be to maintain the printed circuit windings stationary, and to use the permanent magnet structure as a rotor. The magnetic return plate which must be located on the opposite side of the printed circuit winding could then be held stationary to permit access to the outer periphery of the printed circuit windings where the connections are available for supplying energization current. Unfortunately, the rotation of the permanent magnet structure with its poles adjacent to the magnetic return plate, induces eddy currents in the stationary magnetic return plate, and these eddy currents create substantial losses in the system. These losses may be reduced significantly through the use of laminated magnetic structures; however, this lamination makes the structure somewhat expensive, and losses are still present in the arrangement.

Accordingly, a principal object of the present invention is to provide an improved low loss brushless DC motor. A collateral object of the invention is to reduce the size of rigid disk digital memory systems.

SUMMARY OF THE INVENTION

In accordance with the present invention, a brushless DC motor has as its stator a series of printed circuit windings, and has a rotor which includes both a permanent magnet structure on one side of the printed circuit stator, and also a magnetic return path on the other side of the stator, with both the permanent magnet and the return path being in close proximity to the printed circuit stator.

In accordance with a feature of this invention, the permanent magnet structure along with the entire magnetic-flux return path is allowed to rotate. This eliminates the eddy-current losses which would have occurred if any part of the magnetic-flux return path were kept stationary as there would be a relative motion between the magnetic flux and the stationary member of the magnetic-flux return path. While this does not eliminate all eddy-current losses in the motor because the stationary reactive field created by the armature currents produces some low level eddy currents in the rotor, the contribution to the motor losses caused by this effect is very small.

In a specific implementation of the invention, the printed-circuit stator consists of six independent coils, each of which may include several of the printed circuit windings. These six coils are arranged in a Y-configuration with two coils connected in series in each leg of the Y-connection. The three ends of the Y-configuration are brought out so that they can be energized under the control of position sensing arrangements associated with the rotor. When energized in a proper time sequence, these coils produce continuous rotating torque on the eight-pole permanent magnet structure attached to the rotor.

The three connections necessary to energize the Y-configuration of the six coils are brought out on an additional printed circuit which connects to the printed circuit stator near its periphery where the coils are accessible, and extends to near the center of the structure to facilitate the connection of energization circuits within the inner periphery of the re-entrant permanent magnet rotor structure.

A more detailed aspect of the invention involves the use of a mechanical configuration which includes a radially extending heavy support member which firmly mounts a hollow frame member intermediate its ends. A shaft is mounted on heavy precision bearings within the hollow frame member and carries the rotor on one end to cooperate with the printed circuit stator which is fixedly mounted on one end of the hollow frame member. In one illustrative embodiment of the invention, magnetic storage discs are mounted on the other end of the shaft and these are mounted so that they occupy the space around the other end of the hollow supporting frame member, and are located immediately on the other side of the radially extending support member from the re-entrant portion of the permanent magnet rotor.

The position sensing function may be accomplished through the use of light-emitting diodes and phototransistors mounted adjacent to the periphery of one of the plates included in the permanent magnet rotor structure. The peripheral edge of this rotor plate is cut so as to selectively interrupt the light, thus providing the means for sequentially turning the phototransistors on and off, thereby indicating the angular position of the rotor. This information is used for energizing the windings of the printed-circuit stator.

Advantages of the structure described above include low loss properties, with the magnetic return path moving with the permanent magnet structure, thus eliminating most eddy currents; and an exceedingly compact memory unit, resulting from the low heat loss of the motor, and the compact structural design.

Other objects, features, and advantages of the invention will become apparent from a consideration of the following detailed description, and from the accompanying drawings.

BRIEF DESCRIPTION OF THE DRAWINGS

FIG. 6 is a simplified block circuit diagram of the stator energization circuitry;

FIG. 7 is a circuit diagram showing the precise mode of energization of the six sets of coils included in the stator; and FIG. 8 shows a printed circuit board by which the connections to the printed circuit windings are brought inward near the center of the structure.

DETAILED DESCRIPTION

Figure 1:
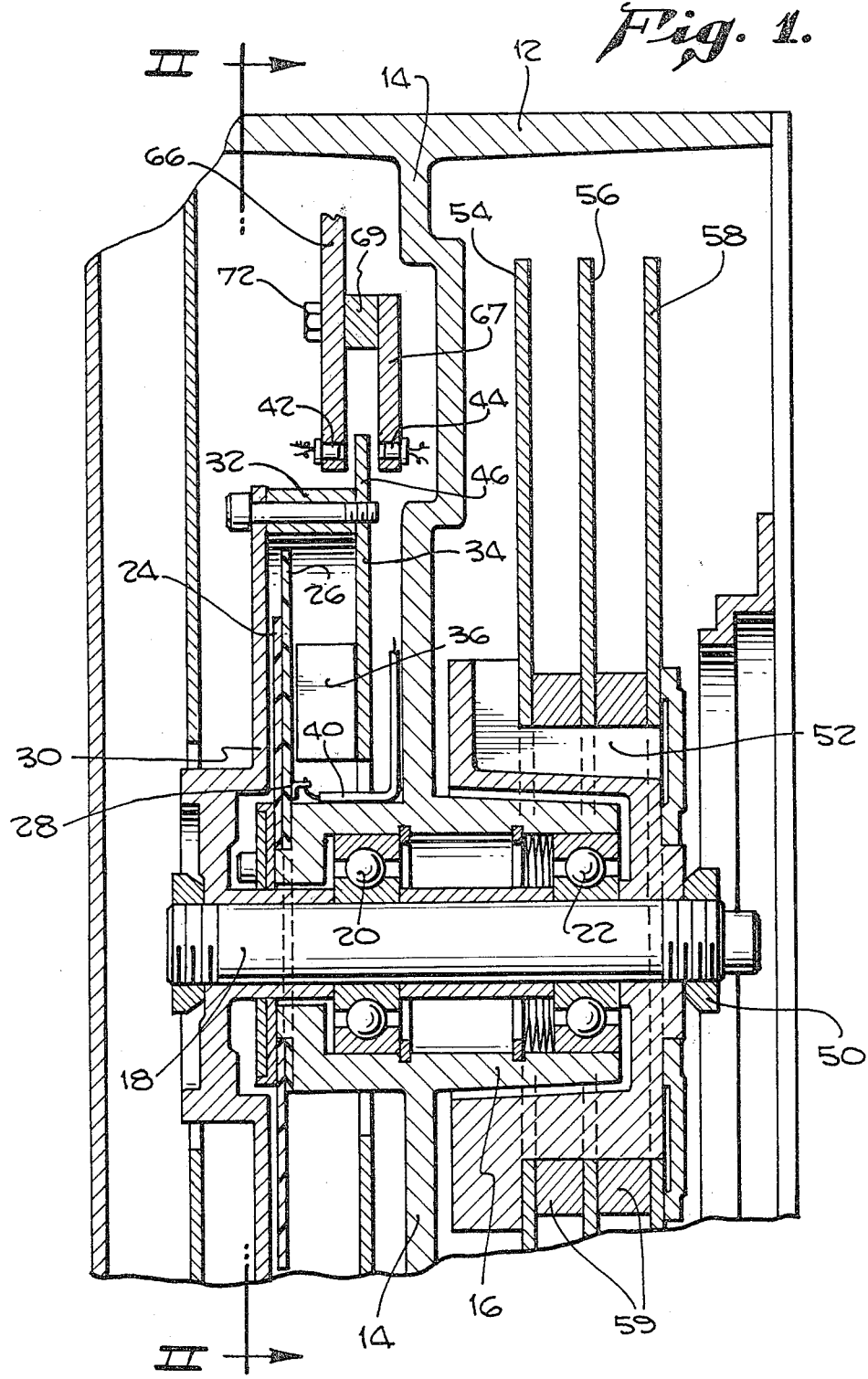
FIG. 1 is a cross-sectional view of a brushless DC motor illustrating the principles of the present invention.

Referring more particularly to the drawings, FIG. 1 shows the outer peripheral frame 12 of the apparatus from which the radially extending frame member 14 extends inwardly to support the hollow heavy cylindrical frame member 16. A heavy shaft 18 is journaled on the heavy precision bearings 20 and 22 within the hollow frame member 16. At one end of the hollow frame member 16 is secured a printed circuit stator 24. Immediately adjacent to the printed circuit stator 24 is another printed circuit 26 which serves to bring the electrical connections from the outer periphery of the stator 24 to the terminal points 28, as will be discussed in greater detail below.

Secured to the left-hand end of the shaft 18, as shown in FIG. 1, is the rotor of the permanent magnet motor, including a magnetic structure 30, which extends in proximity to the printed circuit stator 24 and around its outer periphery. Secured to the member 30 by the fasteners 32 is the magnetic plate 34 to which a permanent magnet 36 is securely fastened. The entire magnetic structure, including the permanent magnet 36 and the magnetic return path including the plate 34 and the magnetic member 30, rotates with respect to the printed circuit stator 24, on the shaft 18.

Power to the windings on the printed circuit stator 24 is supplied to the contacts 28 over wires 40. The timing for the energization of the individual windings of the printed circuit stator 24 is controlled by sensors which determine the angular position of the rotor assembly. The position sensing function is accomplished by three photosensors, each including a light-emitting diode 44 and a phototransistor 42. The outer periphery 46 of the plate 34 extends through the light path of the photosensor combination 42, 44; and this outer periphery 46 is cut away in four 45 degree sections, as discussed in greater detail below, to selectively interrupt the three photosensor light beam paths.

Secured to the other end of the shaft 18 by a nut 50 is a rotating support member 52, and three magnetic storage discs 54, 56 and 58, spaced apart by spacer rings 59. It may be noted that the discs 54, 56 and 58 are mounted to rotate about the right-hand end of the hollow support member 16, and on the other side of the radially extending frame member 14 from the motor structure. Further, the positioning of the rotor of the motor to rotate about one end of the hollow frame member 16 and the positioning of the storage disk assembly to rotate about the other end of the hollow frame member 16, serves to minimize the forces which are applied to the precision bearings 20 and 22, which support the rotating shaft 18 relatively to the hollow frame member 16.

Figure 2:
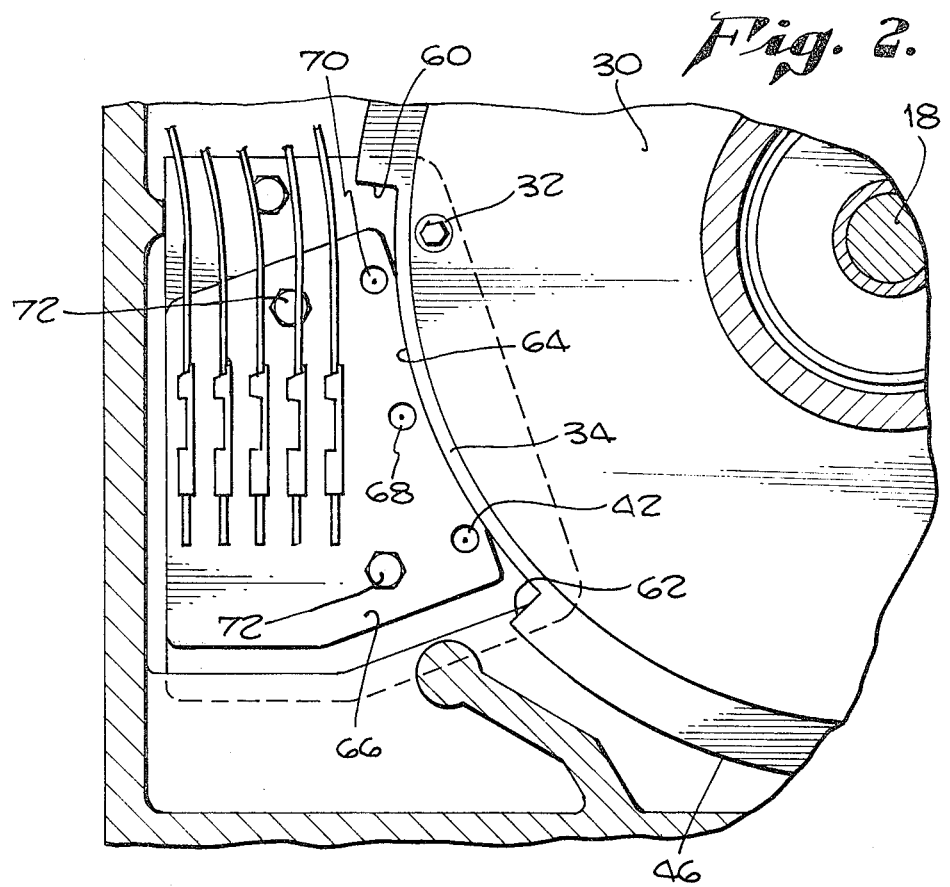
FIG. 2 is a view of a portion of the assembly of FIG. 1 taken along lines II—II of FIG. 1.

FIG. 2 is a partial fragmentary view taken along lines II—II of FIG. 1. FIG. 2 shows to advantage the outer rim 46 of the magnetic disc 34 extending beyond the magnetic structure 30. The edges 60 and 62 and the circle 64 define a notch in the outer periphery 46 of the disc 34, and this notch extends for precisely 45 degrees, in the specific illustrative embodiment of the invention disclosed in the present patent specification. In addition to the photosensor including the photo transistor 42, the sensor mounting plate 66 includes two additional sensors 68 and 70, which are angularly displaced from one another by 15 degrees. In addition to the notch shown in FIG. 2, the outer periphery 46 of the disc 34 has three additional notches evenly spaced at 90 degree intervals. Accordingly, with the three sensors located as indicated in FIG. 2, the rotational position of the rotor may be accurately determined in 15 degree increments, and these critical orientations of the rotor are employed to time the energization of selected windings on the printed circuit stator, as disclosed in greater detail below. Incidentally, the light sources including light emitting diode 44 are mounted on a small plate 67 spaced apart and mounted to plate 66 (on which the photo transistors are mounted) by the spacer plate 69.

Figure 3:
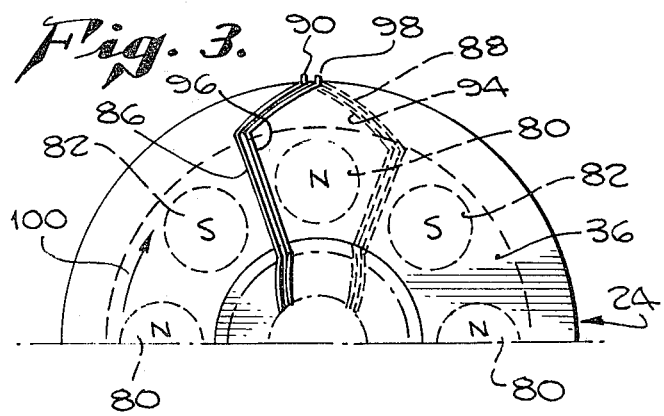
FIG. 3 is a schematic view of a printed circuit winding for use in the present motor.
Figure 4:
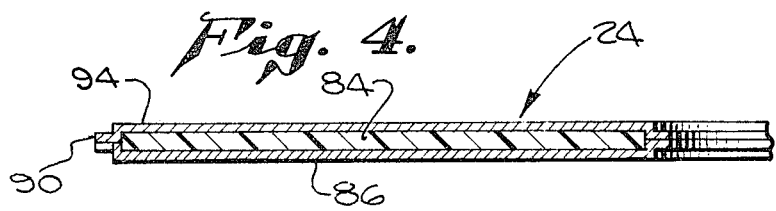
FIG. 4 is a cross-sectional view of the printed circuit winding of FIG. 3.

FIG. 3 is a diagrammatic showing of the printed circuit stator 24 superposed over the permanent magnet 36 forming part of the rotor, and including four north magnetic pole zones designated 80, and four south magnetic poles designated 82 immediately adjacent to the surface of the printed circuit stator 24. The precise configuration of the printed circuit stator will not be considered in great detail, as this is a part which is available from Photocircuits Corporation, and various embodiments of the printed circuit windings are disclosed in U.S. Pat. No. 3,144,574, granted Aug. 11, 1964. However, the following very brief description will be given. First, with respect to the structure, it includes a central this insulating disc 84, as shown in FIG. 4, and printed circuit conductors forming the coils of the winding 86 and 94 on opposite sides of the insulator 84. The end tabs of the conductors 86 end 94 may be secured together at 90 by soldering or the like, or these tabs may be left unconnected for external connections where desired. In addition, instead of just a single insulating layer and two conductors, the structure may be made in a multi-layer configuration with additional windings.

In FIG. 3, the conductor 86 is shown extending up one side of the printed circuit assembly and in dashed lines as conductor 94 extending down the other side of the insulating disc after being secured at point 90 to conductor 86. A second pair of adjacent conductors 96 and 88 are also shown in FIG. 3 interconnected at point 98 where their outer tabs extend beyond the periphery of the insulating disc. A complete series of conductors covering the entire surface of the disc 24 is of course provided.

In considering the energization of the conductors 86, 96, 94 and 88, for example, with each of them being located at a neutral point in the magnetic field, flow of current through them would not produce any relative torque between the rotor and the stator. Accordingly, during the interval when they are in this position, they are de-energized. However, when the permanent magnet 36 forming part of the rotor advances in the direction indicated by the arrow 100 so that one of the south poles 82 is underneath the conductor 86, and the north pole 80 is underneath the conductor 94, then these two conductors are energized in opposite directions to produce a rotating force to accelerate or maintain the speed of the rotor. Then, as the conductors are located between the next set of poles, they are de-energized; immediately subsequently they are energized in the opposite direction, as they are located over magnetic poles of the opposite polarity. With eight magnetic poles, this divides the 360 degrees of rotation into 45 degree segments associated with each pole, and this is further subdivided into a 15 degree interval during which the winding is de-energized and a 30 degree interval during which the winding is energized. In accordance with the construction of the printed circuit coils available as described above, the printed circuit coils may be broken down into six windings which when selectively energized in one direction or the other, or de-energized, serve to continuously apply a smooth angular force between the printed circuit windings of the stator and the permanent magnet rotor.

Figure 5:
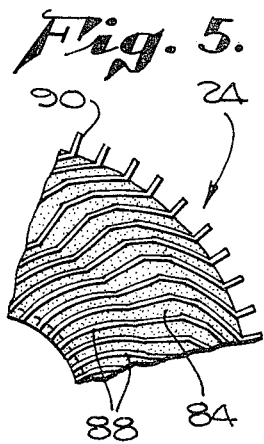
FIG. 5 shows a section of the printed circuit windings of FIG. 3 in greater detail, showing only the windings on one side and the peripheral interconnection tabs.

FIG. 5 is a detailed view of the conductors on the outer surface of one side of the printed circuit stator. In the particular printed circuit stator which was employed, there were 234 external tab connections between adjacent conductors in different layers of the assembly around the outer periphery of the stator 24. Connections to the six staggered coils were effected by opening the connections, or not making the peripheral connections, between tabs spaced along the periphery by successive increments of 10 tabs and extending over a total of 50 peripheral tabs. Of course, the foregoing specific arrangements merely relate to the one illustrative printed circuit armature which was employed, and involved the configuration for use with the 8 pole permanent magnet structure; other magnetic structures and other corresponding printed circuit wiring arrangements could, of course, be employed.

FIG. 6 is a block circuit diagram indicating the control of the printed circuit stator windings 112, which are of course mounted on the stator 24, from the three photosensors 114 shown to the left in FIG. 6, and which provides signals indicating successive increments of 15 degrees in rotation of the rotor, as shown in FIGS. 1 and 2. Under the control of logic circuitry 116, the driver circuitry 118 for properly energizing the 6 stator coils in proper time relationship to the orientation of the rotor, is shown in FIG. 7.

In FIG. 7, the six printed circuit stator coils referred to above are shown at 121, 122, 123, 124, 125 and 126. The three external points of the Y-connection are points 128, 130 and 132. By suitable energization of the two transistors associated with each of these three external points 128, 130 and 132 of the Y-connected coils, current may be directed through the six coils in either direction. More specifically, the transistors 134 and 136 are associated with the circuit point 128; the two transistors 138 and 140 are associated with the circuit point 130; and the two transistors 142 and 144 are associated with the third external circuit point 132 of the Y-connected coils. Each of the three external circuit points 128, 130, or 132 can be connected either to some positive voltage or ground depending on which one of the two transistors, associated with that external circuit point, is turned on. More specifically, for example, turning the transistor 138 on connects the point 130 to the positive voltage, whereas turning the transistor 140 on connects the point 130 to ground. By connecting one of the points to the positive voltage supply and another of the three points to ground, while the two transistors associated with the third external point of the "Y" are turned off, current may be directed through the four coils in the desired direction, while the two coils are de-energized. Similarly, by reversing the connections to the two points, the flow of current may be directed oppositely. In summary, it has been determined that, using the printed circuit stator as described above, and the permanent magnet rotor, the proper sequence of coil energization may be simply obtained with a minimum of external connections using the "Y" circuit configuration shown in FIG. 7.

FIG. 8 shows the printed circuit board 26 of FIG. 1, when connects the six coils obtained by separating the tabs on the periphery of the printed circuit stator, as described below, to provide the three external connection points 128, 130 and 132 which correspond to those shown in FIG. 7. The tabs from the outer periphery of printed circuit stator 24 are soldered to the outer connector points 148 on the printed circuit board 26. Through the use of the printed circuit board 26, the connections are brought past the permanent magnet rotor without interfering with its rotation in close proximity to the printed circuit armature.

In conclusion, it is to be understood that the arrangements as described hereinabove are merely illustrative of the principles of the present invention. Thus, by way of example and not of limitation, other forms of printed circuit stators could be employed, and rotors having other permanent magnet configurations could also be utilized. Similarly, instead of the particular mechanical load which is disclosed herein, other applications may be implemented. Accordingly, the present invention is not to be limited to that precisely as disclosed herein.

What is claimed is:

1. A compact motor and magnetic disc drive assembly comprising:
    a fixed heavy hollow frame member;
    a thin printed circuit type stator;
    means for fixedly mounting said stator on one end of said frame member;
    a shaft journaled within said hollow frame member;
    a rotor;
    means for mounting said rotor on one end of said shaft to extend outwardly past said one end of said hollow frame member, radially outwardly around said stator member and back toward said fixed frame member on the other side of said stator;
    a heavy frame member secured to and extending radially outward from said hollow frame member intermediate the ends thereof; and
    a magnetic storage disc assembly mounted on the other end of said shaft from said rotor, said magnetic disc assembly including at least one radially extending disc mounted for rotation about the other end of said hollow frame member on the other side of said radially extending frame from said rotor;
    whereby said motor and storage disc assembly are isolated from one another to decrease interference and to increase reliability, and form a compact assembly of minimal axial extent.

2. An assembly as defined in claim 1:
    wherein said stator is a thin printed circuit motor winding assembly including flat generally outwardly extending conductors arranged on opposite sides of at least one insulating layer, in a generally disc shaped configuration, to form a series of winding turns physically staggered around said disc; and
    wherein said rotor includes permanent magnet means having a series of successive north and south magnetic poles spaced close to said stator on one side of said winding turns, and magnetic return path means rigidly connected to the other side of said permanent magnet means and extending around the edge of said stator and in close proximity to the other side of said stator opposite said magnetic poles; whereby no relative motion occurs between the magnetic return path and the permanent magnet means, thereby eliminating the major cause of eddy current losses from the motor assembly.

3. An assembly as defined in claim 2 wherein said permanent magnet means is in the form of a flat annular disc.

4. An assembly as defined in claim 2 wherein said means for sensing the angular position of said rotor includes fixed photosensing means adjacent to the periphery of said rotor, and means secured to said rotor for controlling the operation of said photosensing means.

5. An assembly as defined in claim 4 wherein said photosensor controlling means constitutes the periphery of a magnetic plate forming part of said rotor, said periphery being of varying radial extent to selectively interrupt said photosensing means.

6. An assembly as defined in claim 4 wherein said photosensing means includes three photosensors peripherally spaced around said rotor.

7. An assembly as defined in claim 1 further comprising:
means for sensing the angular position of said rotor; and
means under the control of said sensing means for energizing the turns of said printed circuit stator to produce a rotating magnetic field to apply force to said rotor.

8. A motor assembly as defined in claim 1 wherein printed circuit means are provided for bringing electrical connections from the periphery of said printed circuit stator across one face of said stator and past said rotor to a zone adjacent the center of the motor assembly.

9. A compact high capacity rigid disc memory assembly comprising:
an outer housing;
a heavy transverse frame member supported by said housing and dividing said housing into first and second volumes;
a heavy hollow frame member supported by said transverse frame member and extending into both of said volumes from said frame member;
a printed circuit stator mounted at one end of said hollow frame member in a first one of said volumes;
a rotatable shaft mounted on bearings located near the ends of said hollow frame member and extending into both of said volumes;
a rotor mounted on one end of said shaft in said first volume;
said rotor including permanent magnet means having a series of successive north and south magnetic poles spaced close to said stator on one side of said winding turns, and magnetic return path means rigidly connected to the other side of said permanent magnet means and extending around the edge of said stator and in close proximity to the other side of said stator opposite said magnetic poles, with one portion of said rotor being adjacent to said transverse frame member and encompassing one end of said hollow frame member; and
a magnetic storage disc assembly mounted on the other end of said rotatable shaft from said rotor, said magnetic disc assembly including at least two radially extending discs mounted for rotation about the other end of said hollow frame member on the other side of said radially extending frame member from said rotor;
whereby the low heat losses and compact nature of the rotor and disc assemblies provide high storage capacity per unit volume.

10. An assembly as defined in claim 9:
wherein said stator is a thin printed circuit motor winding assembly including flat generally outwardly extending conductors arranged on opposite sides of at least one insulating layer, in a generally disc shaped configuration, to form a series of winding turns physically staggered around said disc.

11. An assembly as defined in claim 9 further comprising:
means for sensing the angular position of said rotor; and
means under the control of said sensing means for energizing the turns of said printed circuit stator to produce a rotating magnetic field to apply force to said rotor.

12. An assembly as defined in claim 11 wherein said means for sensing the angular position of said rotor includes fixed photosensing means adjacent to the periphery of said rotor, and means secured to said rotor for controlling the operation of said photosensing means.

13. An assembly as defined in claim 12 wherein said photosensor controlling means constitutes the periphery of a magnetic plate forming part of said rotor, said periphery being of varying radial extent to selectively interrupt said photosensing means.

14. An assembly as defined in claim 12 wherein said photosensing means includes three photosensors peripherally spaced around said rotor.

15. A motor assembly as defined in claim 9 wherein printed circuit means are provided for bringing electrical connections from the periphery of said printed circuit stator across one face of said stator and past said rotor to a zone adjacent the center of the motor assembly.

16. An assembly as defined in claim 9 wherein said permanent magnet means is in the form of a flat annular disc.

* * * * *